United States Patent [19]

Robert

[11] Patent Number: 4,847,860
[45] Date of Patent: Jul. 11, 1989

[54] PHASE-CONTROL SYSTEM FOR TELECOMMUNICATIONS SIGNALS RECEIVED BY AN ADAPTIVE ANTENNA

[75] Inventor: André Robert, Paris, France

[73] Assignee: Societe Anonyme de Telecommunications, Paris, France

[21] Appl. No.: 846,799

[22] Filed: Apr. 1, 1986

[30] Foreign Application Priority Data

Apr. 12, 1985 [FR] France ................................ 85 05557

[51] Int. Cl.$^4$ .............................................. H04B 1/12
[52] U.S. Cl. .......................................... 375/1; 380/33; 380/34; 455/284; 455/304; 455/305
[58] Field of Search ................................ 455/303–307, 455/278, 283, 284; 380/6, 7–9, 33, 34; 375/1

[56] References Cited

U.S. PATENT DOCUMENTS

| | | | |
|---|---|---|---|
| 3,226,646 | 12/1965 | Ludwig | 455/306 |
| 4,027,264 | 5/1977 | Gutleber | 455/306 |
| 4,075,350 | 2/1978 | D'Arcangelis | 455/284 |
| 4,160,875 | 7/1979 | Kahn | 380/6 |
| 4,188,580 | 2/1980 | Nicolai et al. | 375/1 |
| 4,247,939 | 1/1981 | Siromswold et al. | 375/1 |
| 4,283,795 | 8/1981 | Steinberger | 455/283 |
| 4,320,535 | 3/1982 | Brady et al. | 455/303 |
| 4,397,034 | 8/1983 | Cox et al. | 380/33 |
| 4,408,350 | 10/1983 | Donath | 455/284 |
| 4,438,530 | 3/1984 | Steinberger | 455/303 |
| 4,470,145 | 9/1984 | Williams | 375/1 |
| 4,501,004 | 2/1985 | Yoshida et al. | 455/306 |
| 4,623,918 | 11/1986 | Ch/met | 380/7 |
| 4,759,034 | 7/1988 | Nagazumi | 375/1 |

Primary Examiner—Salvatore Cangialosi
Attorney, Agent, or Firm—Lowe, Price, LeBlanc, Becker & Shur

[57] ABSTRACT

In a receiving station having an adaptive receiving antenna, a phasing system comprises a plurality of reception paths receiving telecommunications signals derived from the same useful signal combined in transmission with a disturbing signal having a frequency band outside the frequency band of the useful signal, via a plurality of primary sources of the receiving antenna. The phasing system includes a narrowband filtering circuit for filtering the overall telecommunications signal in one of the reception paths to derive a reference signal undisturbed by the disturbing signal and solely dependent on the useful signal. In phasing circuits respectively assigned to the reception paths, the useful signal alone is set to a phase as close as possible to the phase of the reference signal in order to obtain, after signal summing at outputs of the phasing circuits, a maximum power using signal mixed with an attenuated scrambling signal.

28 Claims, 2 Drawing Sheets

PHASE-CONTROL SYSTEM FOR TELECOMMUNICATIONS SIGNALS RECEIVED BY AN ADAPTIVE ANTENNA

BACKGROUND OF THE INVENTION

1. Field of the Invention

This invention relates generally to the utilization of an adaptive receiving antenna in a receiving station to receive a useful telecommunications signal transmitted by a transmitting station and combined during transmission with a disturbing signal.

2. Description of the Prior Art

It is known in the prior art in the radar field to use an adaptive receiving antenna including a plurality of primary sources feeding a plurality of corresponding reception paths. Due to the distances between the various primary sources on the antenna, the telecommunications signals picked up by the primary sources are relatively out-of-phase and must be matched in phase by comparison with a reference phase in order to sum the received signals into a received signal having a maximum power. Since transmitting and receiving "stations" of a radar are close together, the reference phase is that of the useful transmitted signal which has the same waveform, to within amplitude, as the received signal.

However, in telecommunications systems involving distant transmitting and receiving stations, the receiving station does not know the exact frequency of the transmitted useful signal. Indeed, in the telecommunications field, the nature of the received signal is never completely known a priori, since the purpose of a transmission is precisely to send information from a transmitting station to a receiving station in the form of a sequential modification of the transmitted telecommunications signal i.e., the useful signal.

Moreover, the useful signal received at the receiving station can be degraded by at least one disturbing signal located outside the frequency band of the transmitted signal, in accordance with the standard radiofrequency scheme. Hereafter, in the present specification and claims, such a signal that is located in a frequency band outside of the frequency band of the transmitted useful signal and which arrives at a receiving antenna from a direction different from the direction of the useful signal, to degrade the useful transmitter signal received at the receiving station, is referred to as a disturbing signal. To process the useful signal emitted by the transmitting station and received together with the disturbing signal at the receiving station, it is necessary to attenuate or even eliminate the disturbing signal in the receiving station.

OBJECT OF THE INVENTION

The main object of this invention is to provide a system for phasing telecommunicatons signals, wherein the phasing of the useful transmitted signal included among the various telecommunications signals received by the primary sources of the receiving antenna is obtained by means of a reference signal which depends only on the useful signal and is independent of the disturbing signal.

SUMMARY OF THE INVENTION

Accordingly, there is provided a phase-control system included in a receiving station for phasing telecommunications signals derived from a single useful signal transmitted by a transmitting antenna to a receiving antenna and combined with a disturbing signal having a frequency band at least partly different from a frequency band of the useful signal. The telecommunications signals are respectively fed to a plurality of reception paths by a plurality of receiving antenna primary sources via a plurality of frequency transposing and preamplifying means. The phase-control system comprises filtering means coupled to one of the reception paths for filtering within a narrow frequency band the telecommunications signal fed to the channel to derive a reference signal undisturbed by the disturbing signal. The narrowband is within the frequency band of the useful signal and outside the frequency band of the disturbing signal. The phase-control system further comprises, in each of the reception paths, a phasing means for comparing the phases of the telecommunications signal, derived from the transposing and amplifying means in the path with a phase of the reference signal in order to set the phase of the useful signal included in the telecommunications signal to a phase as near as possible to, i.e., approximately equal to, that of the reference signal.

Because of the narrowband filtering of one of the telecommunications signals to derive the reference signal, a reference phase is supplied that depends only on the useful signal transmitted by the transmitting antenna. In each of the phasing means, a correlation between the reference signal and the received telecommunications signal enables detection of phase mismatches between the useful signal component in the telecommunications signal and the reference signal and correction solely of the phase of the useful signal. In signals leaving the phasing means to be summed, the useful signal is put into phase, whereas the scrambling signal, not being phase matched, is attenuated.

Such phase control of the useful signal in each of the reception paths or channels is obtained by correlating means for comparing the phase of the reference signal with the phase of the useful signal component in the respective telecommunications signal using in-phase and quadrature component signals relative to said respective telecommunications signal to derive two analog control signals, by means for attenuating the in-phase and quadrature component signals on the basis of the sign and amplitude of the two analog phase control signals so as to substantially phase the useful signal with the reference signal, and by means for summing attenuated component signals leaving the attenuation means.

According to another feature of this invention, the phase control signals for each reception path drive a variable-gain amplifier in the reception path so as to amplify the telecommunications signal in the path only according to the level of the useful signal which has been so detected in the path phasing means. Thus, as opposed to the prior art variable-gain amplifier circuits where the gain varies as a function of the detected envelope of the telecommunications signal, or otherwise stated, as a function of the combined useful and scrambling signals, an amplifier gain control according to the invention depends only upon the useful signal. Specifically, when the useful signal is weak in comparison with the disturbing signal, the gain control according to the prior art amplifies the telecommunications signal based upon the level of the disturbing signal, but the gain control according to the invention amplifies the telecommunications signal based upon the level of the useful signal, thus enabling it to be suitably detected for phasing.

According to yet another feature of this invention, the phase control signals for any two reception paths are processed in calculating means to establish the angular position of the transmitting antenna with respect to the receiving antenna. As will be explained hereinafter, this enables the particular orientation of the receiving antenna to be slaved to the position of the transmitting antenna for the purpose of receiving a highest possible power of useful signal, when the transmitting station is mobile, for example.

BRIEF DESCRIPTION OF THE DRAWING

The foregoing and other objects, features and advantages of the invention will be apparent from the following detailed description of several preferred embodiments of the invention with reference to the corresponding accompanying drawings in which.

DESCRIPTION OF THE PREFERRED EMBODIMENTS

Figure 1:
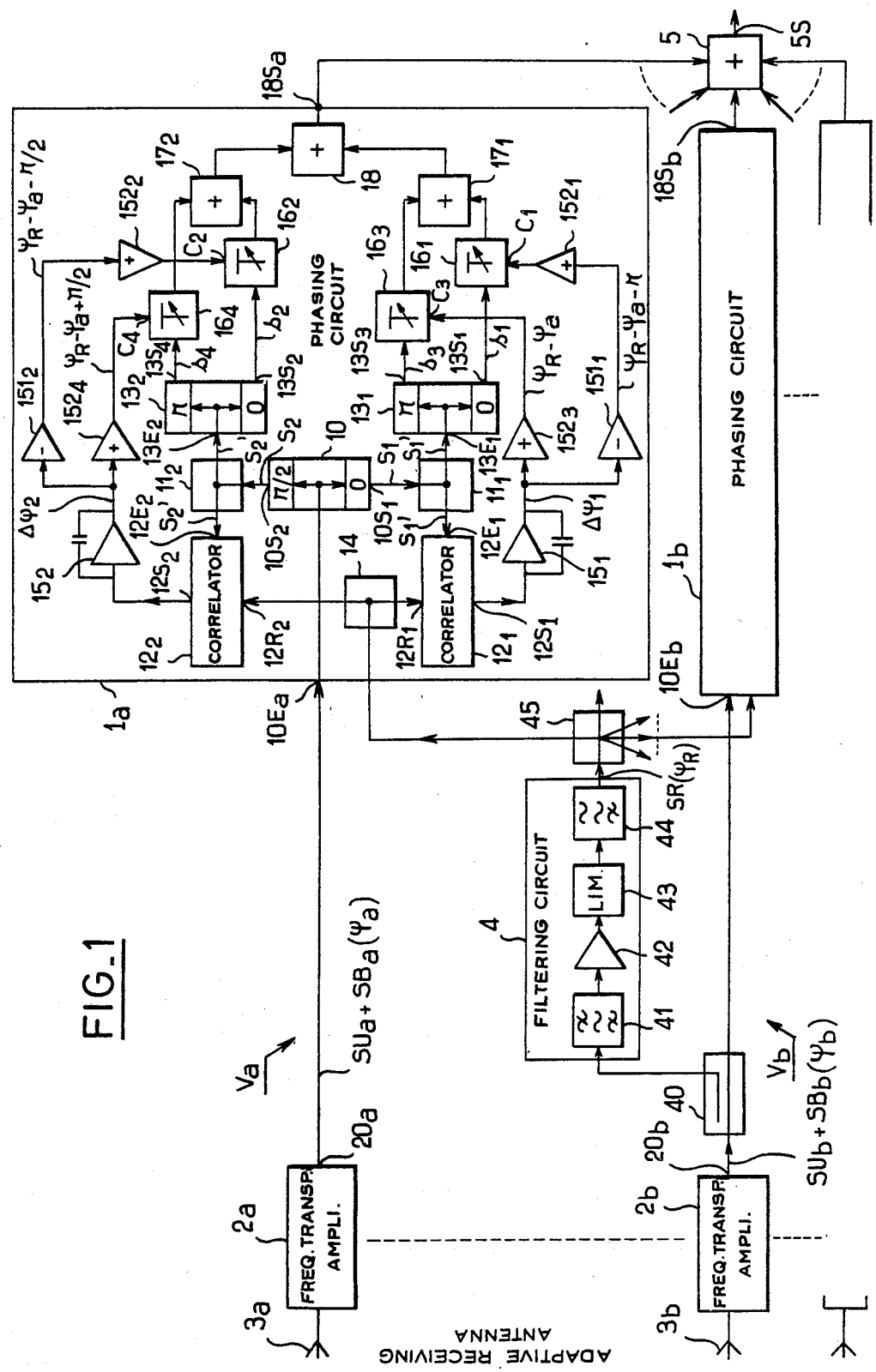
FIG. 1 is a block diagram of phase-control system embodying the invention, included in an adaptive telecommunications receiving station, one of phasing circuits assigned to a reception path of the station being shown in detail.

In FIG. 1 are only shown in detail two of several reception paths $V_a$, $V_b$, ... of a receiving station receiving via an adaptive antenna a useful telecommunications signal, a telephone signal for instance, transmitted by a transmitting station. It is remembered that an adaptive antenna includes a group of two or more primary sources, or elements such as dipoles, receiving a useful signal SU, with relative phase shifts such as $\Psi_a$ and $\Psi_b$ for two channels or paths $V_a$ and $V_b$ illustrated in FIG. 1. It is assumed throughout the following that the primary sources also receive a disturbing signal SB characterized by a frequency spectrum outside the frequency band of the useful signal SU and arriving from a direction different from than the useful signal direction between the transmitting and receiving stations. The useful signal SU may for example be a frequency-modulated signal or a phase-modulated signal, i.e., an angle modulated signal, having a carrier modulated by either a digital signal or an analog signal. The signal carrier has a frequency lying for example in the range of 1 to 10 GHz.

The term "reception path" used herein shall be understood to mean a combination of circuits for amplifying and transforming signals received by a primary source of the receiving antenna.

Each reception path $V_a$, $V_b$, ... comprises identical input circuits $2_a$, $2_b$, ... receiving, via an associated primary source $3_a$, $3_b$, ... of the adaptive receiving antenna, a telecommunications signal corresponding to a combination of the useful signal SU phase-shifted by $\Psi_a$, $\Psi_b$, ... with the disturbing signal. The useful signal and the scrambling signal are subjected to same conventional transformations in the input circuits. In input circuits $2_a$, $2_b$, ..., the received signal is subjected to one or two frequency transpositions and a preamplification to produce a signal $SU_a+SB_a$, $SU_b+SB_b$, ... transposed to an intermediate frequency IF, generally equal to 70 MHz. The preamplification may be carried out after one or both frequency transpositions, by means of an automatic gain control (AGC) circuit which detects an IF signal envelope and compares it with a reference voltage in order to preamplify the received signal as a whole, i.e. the useful signal mixed with the scrambling signal.

After going through the input circuits $2_a$, $2_b$, ..., the signal $SU_a+SB_a$, $SU_b+SB_b$, ... in the respective reception path $V_a$, $V_b$, ... is subjected to certain transformations in a respective phasing circuit $1_a$, $1_b$, ..., as explained hereinafter, in order to sum in phase the signals received at the frequency of the useful signal alone, and thus recover a maximum of energy of the useful signal and attenuate to a large extent the disturbing signal. Besides this, a small part of the received signal energy is taken from one of the reception paths, such as path $V_b$, to derive a reference signal SR that is used specifically to find the in-phase sum of the signals at the useful frequency.

In accordance with the invention, the reference signal SR is obtained in a filtering circuit 4. A main function of circuit 4 is narrowband filtering of the $SU_b+SB_b$ signal in path $1_b$. An input of filtering circuit 4 is coupled to reception path $1_b$ via a coupler 40. Coupler 40 is interconnected between output $20_b$ of input circuits $2_b$ and input $10E_b$ of a power divider 10 included in phasing circuit $1_b$. Filtering circuit 4 comprises from an input connected to coupler 40, circuits connected in series such as a bandpass filter 41, an amplifier 42, an amplitude limiter 43 and a low-pass filter 44. Bandpass filter 41 is a narrowband filter which takes out a narrowband of the frequency range of the useful signal SU carried in the overall signal $SU_b+SB_b$. This narrowband is outside the frequency band of the disturbing signal SB to produce a reference signal SR undisturbed by the disturbing signal.

The signal produced by an output of the filter 44 is not degraded by the disturbing signal and serves as reference signal SR according to the invention, to phase together the useful signals $SU_a$, $SU_b$, ... in the reception paths $V_a$, $V_b$, ... The signal SR is distributed to all the paths $V_a$, $V_b$, ... by a common power divider 45 having an input connected to the output of the low-pass filter 44 and outputs connected respectively to inputs of dual-output power dividers included in phasing circuits $1_a$, $1_b$, ... such as power divider 14 in circuit $1_a$ in FIG. 1.

The phasing circuits $1_a$, $1_b$, ... in all of the paths $V_a$, $V_b$, ... of the receiving station being identical, only circuit $1_a$ in reception path $V_a$ is hereinafter described with reference to FIG. 1.

The phasing circuit $1_a$ comprises two quasi-identical main sub-paths. The two main sub-paths each are divided into two quasi-identical secondary sub-paths to divide the overall $SU_a+SB_a$ signal into four component signals in quadrature pairs and act upon the amplitude of the four component signals to obtain a useful signal $SU_a$ phase as close as possible to phase $\Psi_R$ of the reference signal SR. This breaking down of path $1_a$ into four sub-paths enables phasing of the signal SU in all four quadrants $(0, \pi/2)$, $(\pi/2, \pi)$, $(\pi, 3\pi/2)$ and $(3\pi/2, 2\pi)$ of the phase diagram, regardless of the phase difference $\Psi_R - \Psi_a$ between signal $SU_a$ and reference signal SR.

Circuit $1_a$ comprises an input circuit consisting of a balanced power divider 10 receiving, via an input $10E_a$, the signal $SU_a+SB_a$ supplied by an output $20_a$ of the input circuits $2_a$, and producing two signals $S_1$ and $S_2$ having a same amplitude but a relative phase shift of $\pi/2$ at two outputs $10S_1$ and $10S_2$ which constitute respective inputs of the two main sub-paths. Signal $S_1$ leaving output $10S_1$ is in phase with the overal $SU_a+SB_a$ signal. Signal $S_2$ leaving output $10S_2$ is phase shifted by $\pi/2$ with respect to signal $SU_a+SB_a$ and signal $S_1$ by means of a $\pi/2$ phase-shifter included in the power divider 10.

The signals $S_1$ and $S_2$ are each separated into two identical signals $S_1'$ and $S_2'$ thanks to balanced power dividers $11_1$ and $11_2$. Two signals $S_1'$ and $S_2'$ are applied to first inputs $12E_1$ and $12E_2$ of correlators $12_1$ and $12_2$, and two other signals $S_1'$ and $S_2'$ are applied to inputs $13E_1$ and $13E_2$ of balanced power dividers $13_1$ and $13_2$ each having a $\pi$ phase shifter respectively. Outputs $13S_1$ and $13S_3$ of divider $13_1$ constitute inputs of the two secondary sub-paths of the first main sub-path and supply signals $s_1$ and $s_3$ having equal amplitudes but phase shifted by 0 and $\pi$ respectively with respect to signal $SU_a+SB_a$ at input $10E_a$. Inputs of the two secondary sub-paths of the second main sub-path are provided by outputs $13S_2$ and $13S_4$ of the power divider $13_2$ which supply signals $s_2$ and $s_4$ having equal amplitudes but phase shifted by $\pi/2$ and $3\pi/2$ respectively with respect to signal $SU_a+SB_a$ at input $10E_a$.

Two outputs of the power divider 14 in circuit $1_a$ feed the reference signal to second inputs $12R_1$ and $12R_2$ of correlators $12_1$ and $12_2$. Reference signal SR is compared with the 0 and $\pi/2$ phase-shifted signals $S_1'$ and $S_2'$ in the correlators $12_1$ and $12_2$. Signals delivered by outputs $12S_1$ and $12S_2$ of correlators $12_1$ and $12_2$ are strictly a function of the relative phase between the $SU_a+SB_a$ signal in path $V_a$ and the reference signal SR, taken at the frequency of the useful signal. Products of the comparisons made with the disturbing signal $SB_a$ are finally completely eliminated by means of integrators $15_1$ and $15_2$ which are connected to outputs $12S_1$ and $12S_2$ of correlators $12_1$ and $12_2$ and which supply analog phase control signals $\Delta\Psi_1$ and $\Delta\Psi_2$. Integrators $15_1$ and $15_2$ have integration time constants allowing only low-frequency components to pass, coming from the correlation of the $SU_a$ and SR signals, while higher frequency components resulting from the correlation of the $SB_a$ and SR signals having different frequencies are notably attenuated. Signals $\Delta\Psi_1$ and $\Delta\Psi_2$ have non-zero amplitudes only for frequency components of the reference signal SR also appearing in signals $S_1$ and $S_2$, i.e. in signal $SU_a$. Typically, the time constants of the integrators $15_1$ and $15_2$ are on the order of 1 to 10 ms for a narrow frequency band of the reference signal SR of about 1 MHz obtained by filtering a useful signal SU having a useful frequency band of 10 MHz.

The two phase control signals $\Delta\Psi_1$ and $\Delta\Psi_2$ are respectively inverted in amplitude inverters $151_1$ and $151_2$, then are amplified in amplifiers $152_1$ and $152_2$ to feed control inputs $C_1$ and $C_2$ of analog multipliers $16_1$ $16_2$. In addition, signals $\Delta\Psi_1$ and $\Delta\Psi_2$ are respectively applied to control inputs $C_3$ and $C_4$ and of second analog multipliers $16_3$ and $16_4$ via amplifiers $152_3$ and $152_4$. Inverters $151_1$ and $151_2$ and amplifiers $152_3$ to $152_4$ thus determine the signs and amplitudes of the control signals $\Delta\Psi_1$ and $\Delta\Psi_2$. The analog multipliers $16_1$ and $16_4$ can be PIN-diode controlled attenuators and constitute the secondary sub-paths receiving component signals $s_1$ to $s_4$ phase shifted by 0, $\pi/2$, $\pi$ and $3\pi/2$ with respect to signal $SU_a+SB_a$ at the input $10E_a$, respectively. The signals $\Delta\Psi_1$, $\Delta\Psi_2$, $-\Delta\Psi_1$ and $-\Delta\Psi_2$ respectively delivered by the amplifiers $152_1$ to $152_4$ are used to control the phase of the various component signals $s_1$ to $s_4$ in path $V_a$, by acting on the amplitude of the two component signals $S_1'$ and $S_2'$ differing in phase by $\pi/2$, by means of the attenuators $16_1$ to $16_4$ which are voltage controlled according to the positive amplitudes of the respective control signals $-\Delta\Psi_1$, $-\Delta\Psi_2$, $\Delta\Psi_1$ and $\Delta\Psi_2$.

For example, to vary the phase of signal $SU_a$ in the first phase quadrant from 0 to $\pi/2$, the amplitudes of the quadrature component signals $s_1$ and $s_2$ are adjusted by the attenuators $16_1$ and $16_2$. To vary the phase of signal $SU_a$ in the second phase quadrant from $\pi/2$ to $\pi$, it is necessary act on the amplitudes of other quadrature component signals, i.e. on the amplitude of quadrature component signal $S_2$ corresponding to signal $s_2$ and the amplitude of phase component signal $S_1$, having shifted its phase by $\pi$ to produce signal $s_3$; thereafter, the signal $SU_a$ phase shifting between $\pi/2$ and $\pi$ is obtained by means of the attenuators $16_2$ and $16_3$. Likewise, the phase shifts of signal $SU_a$ in the third quadrant from $\pi$ to $3\pi/2$ and the fourth quadrant from $3\pi/2$ to $\pi$ are achieved respectively by the attenuators $16_3$ and $16_4$ and attenuators $16_4$ and $16_1$, respectively.

The two pairs of phased signals leaving attenuators $16_1$ to $16_4$ are mixed in two-input summing circuits $17_1$ and $17_2$, and then in an output summing circuit 18 having two inputs connected to outputs of summing circuits $17_1$ and $17_2$. Output $18S_a$ of circuit 18 in circuit $1_a$ thus supplies a signal including the useful signal $SU_a$ and having a phase substantially equal to the reference phase $\Psi_R$ and a maximum power, and the scrambling signal $SB_a$ not having been shifted back into phase.

The phased useful signals $SU_a$, $SU_b$, . . . and the scrambling signals $SB_a$, $SB_b$, . . . not having been shifted back into phase, supplied by outputs $18S_a$, $18S_b$, . . . of summing circuits 18 in all the phasing circuits $1_a$, $1_b$, . . . are mixed in a common summing circuit 5. An output 5S of circuit 5 supplies a useful signal SU having a maximum power and considerable unscrambled, i.e. mixed with a weak or diminished disturbing signal in comparison with the scrambling signal picked up by the receiving antenna.

In accordance with another embodiment of the invention, the coupling circuit 40 associated with the filtering circuit 4 can be replaced by a coupling circuit interconnected with one of the outputs of the phasing circuits, such as output $18S_a$ or $18S_b$ of circuit $1_a$ or $1_b$, or interconnected with the output 5S of the common summing circuit 5, without altering the phasing principle according to the invention.

Figure 2:
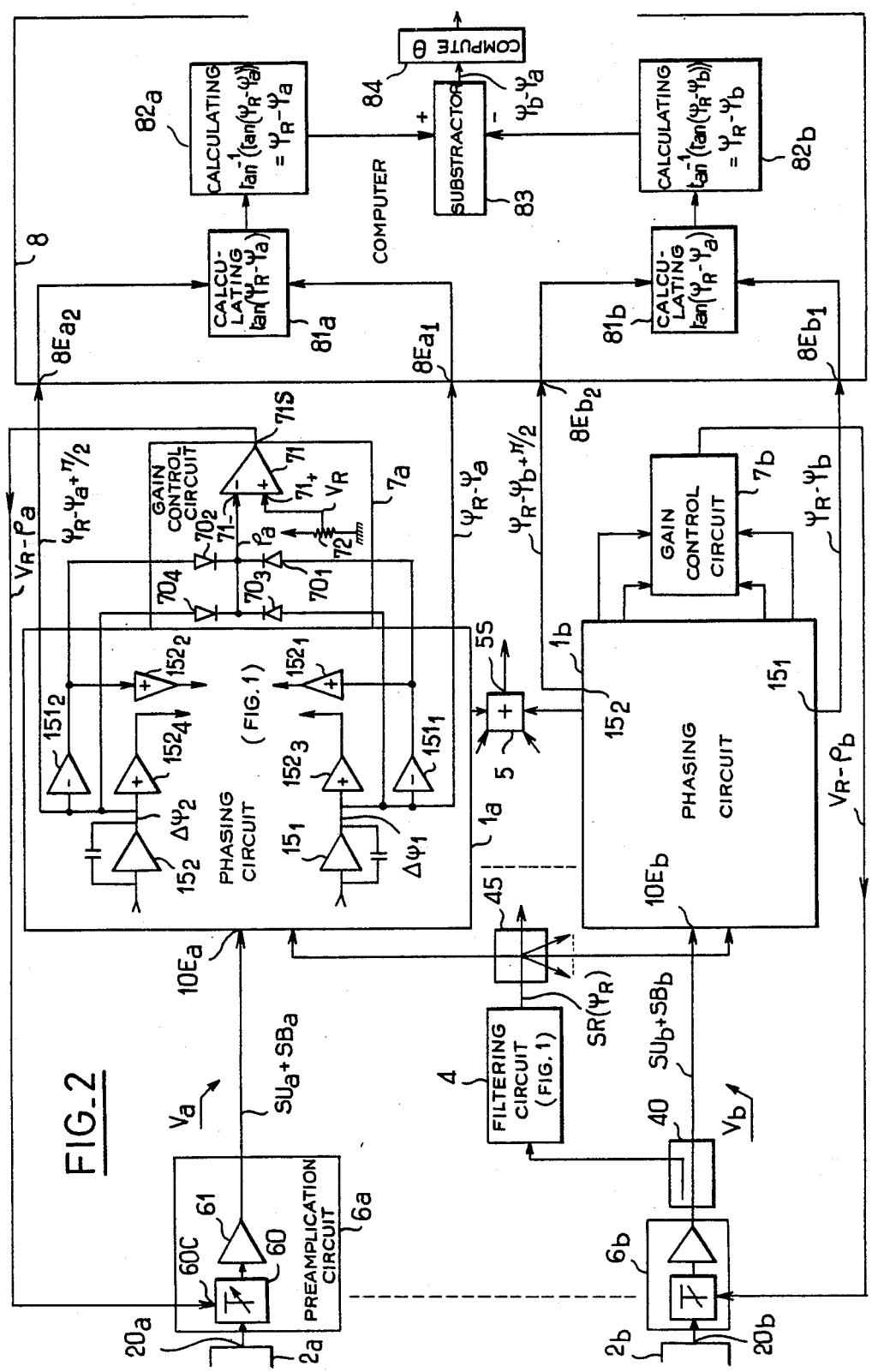
FIG. 2 is a block diagram of a phase control system embodying the invention, comprising gain control means in each of reception paths and a computer to compute an angular position of a transmitting antenna.

In accordance with a first application of the phasing circuits according to the invention, the phase control signals $\Delta\Psi_1$ and $\Delta\Psi_2$ in each reception path are used to control a preamplification of the useful signal leaving the input circuits in the path. As shown in FIG. 2, with reference to reception path $V_a$ for example, a useful signal preamplification circuit $6_a$ is provided between the output $20_a$ of the input circuits $2_a$ and the input $10E_a$ of the power divider 10 in the phasing circuit $1_a$. Circuit $6_a$ includes a variable-gain amplifier 60 and a follower-amplifier 61 series-connected between the terminals $20_a$ and $10E_a$.

Amplifier 60 has a gain controlled by an analog signal $V_R - \rho_a$ derived by a gain control circuit $7_a$. Circuit $7_a$ comprises four diodes $70_1$, $70_2$, $70_3$ and $70_4$ having anodes respectively connected to the outputs of inverters $151_1$ and $151_2$ and to the outputs of integrators $15_1$ and $15_2$, and a voltage comparator 71. An inverse input 71 of comparator 71 is connected to cathodes of diodes $70_1$ to $70_4$ and receives a voltage proportional to a signal $\rho_a$ having the greatest amplitude of all the signals derived from integrators $15_1$ and $15_2$ and inverters $151_1$ and $151_2$, i.e. a voltage proportional to the amplitude of the phase control signals $\Delta\Psi_1$ and $\Delta\Psi_2$ and so varying with the amplitude of the useful signal $SU_a$. The signal $\rho_a$ is compared with a reference voltage $V_R$ applied to a direct input $71_+$ of the comparator 71 after suitable adjustment by means of a potentiometer 72. An output 71S of the comparator 71 thus supplies the control signal $V_R-\rho_a$ which is applied to a gain control input 60C of amplifier 60 to control the preamplification of the signal $SU_a+SB_a$, not on the basis of an envelope of the signal $SU_a+SB_a$ dependent on the amplitude of the scrambling signal $SB_a$ but rather on the basis of the envelope of the useful signal $SU_a$. In fact, the signal $\rho_a$ is directly dependent on the coincidence of the received signal $SU_a+SB_a$ and the reference signal SR in correlators $12_1$ and $12_2$, which reference signal SR is independent of the scrambling signal $SB_a$. The scrambling signal $SB_a$ is also amplified by amplifier 60, but is amplified as a dependent of the useful signal amplitude rather than as a dependent of the combined useful signal and scrambling signal amplitudes.

In accordance with a second application of the phasing circuits according to the invention, the phase control signals for any two reception paths, such as paths $V_a$ and $V_b$, are utilized to determine an angular position of the antenna in the transmitting station in relation to the antenna of the receiving station. As shown in FIG. 2, the receiving station comprises a computer 8 having two first inputs $8E_{a1}$ and $8E_{a2}$ respectively connected to the outputs of the integrators $15_1$ and $15_2$ in phasing circuit $1_a$ and two second inputs $8E_{b1}$ and $8E_{b2}$ respectively connected to the outputs of corresponding integrators $15_1$ and $15_2$ in circuit $1_b$. The first inputs and second inputs of the computer 8 receive signals related to the phases $\Psi_R-\Psi_a$ and $\Psi_R-\Psi_a+\pi/2$, and $\Psi_R-\Psi_b$ and $\Psi_R-\Psi_b+\pi/2$, and therefore actually pairs of signals having a relative phase $\Psi_b-\Psi_a$.

Computations handled by the computer 8 consist particularly in computing the relative phase angle $\Psi_b-\Psi_a$. For this purpose the computer is provided with a first tangent calculating circuit $81_a$ for calculating $\tan(\Psi_R-\Psi_a)$ based upon the phase signals $\Psi_R-\Psi_a$ and $\Psi_R-\Psi_a+\pi/2$, i.e. based upon $\cos(\Psi_R-\Psi_a)$ and $\sin(\Psi_R-\Psi_a)$, a second tangent calculating circuit $81_b$ for calculating $\tan(\Psi_R-\Psi_b)$ based upon the phase signals $\Psi_R-\Psi_b$ and $\Psi_R-\Psi_b+\pi/2$, i.e. based upon $\cos(\Psi_R-\Psi_a)$ and $\sin(\Psi_R-\Psi_a)$, two antitangent calculating circuits $82_a$ and $82_b$ for calculating $\Psi_R-\Psi_a$ and $\Psi_R-\Psi_b$ based upon the signals $\tan(\Psi_R-\Psi_a)$ and $\tan(\Psi_R-\Psi_b)$ and a subtractor 83 for calculating $\Psi_b-\Psi_a$ based upon signals $\Psi_R-\Psi_a$ and $\Psi_R-\Psi_b$.

Using 2d to designate the distance between the two primary sources $3_a$ and $3_b$ of the receiving antenna respectively assigned to the paths $V_a$ and $V_b$, $\lambda$ to designate the wavelength of the transmission carrier and $\theta$ the angle between the direction from the transmitting antenna to the receiving antenna and the mid-perpendicular to the segment joining the two sources $3_a$ and $3_b$, it is known that the difference $\Psi_b-\Psi_a$ is given by the following relation:

$$\Psi_b-\Psi_a = 2\pi \cdot (2d/\lambda) \cdot \sin\theta.$$

From this relation the angle $\theta$ can be found:

$$\theta = \sin^{-1}((\Psi_b-\Psi_a)\cdot\lambda/(4\pi d)).$$

The computer 8 then includes a directional angle computing circuit 84 which computes according to the above mentioned relation the angle $\theta$ as a function of $\Psi_b-\Psi_a$ established by subtractor 83. Advantageously, the distance 2d between the two selected sources $3_a$ and $3_b$ is small, so as to resolve the indeterminacy of the computation of angle $\theta$ to within $k\pi$, where k is an integer.

Based on the value of $\theta$, a known servocontrol means (not shown in the drawings) is used to control the relative position of the receiving antenna in relation to the direction of the antennas in order to receive the greatest possible power of useful signal SU. The servocontrol means thus enables the receiving antenna to be suitably pointed at the transmitting antenna when one of the antennas if movable with respect to the other. Such an angular correction is thus carried out every time a direction-finding or "goniometric" operation is required to ensure adequate reception of telecommunications signals, such as in the case of aircraft navigation and landing radio aids, earth station tracking of a satellite, or the orientating of a receiving antenna in a fixed broadcast station with respect to a mobile broadcasting station aboard a vehicle.

What I claim is:

1. In a receiver for a telecommunications signal derived from a single useful signal transmitted by a transmitting antenna to a receiving antenna and combined during transmission with a disturbing signal, said disturbing signal having a frequency band with frequencies outside a frequency band of said useful signal, said receiver comprising means for feeding the telecommunications signal to a plurality of reception paths from a plurality of primary sources of said receiving antenna via a plurality of frequency transposing and preamplifying means, a phase-control system including:

filtering means having a narrow frequency band that is included in and very small with respect to said frequency band, the narrow band of the filtering means being included in and very small with respect to said frequency band of said useful signal and being totally different from said frequency band of said disturbing signal, said filtering means being coupled to one of said reception paths for filtering, within said narrow frequency band, said telecommunications signal fed to said path to derive a reference signal having a reference phase undisturbed by said disturbing signal, and several phasing means for respectively comparing phases of the telecommunications signal in each reception path with the reference phase of said reference signal to set the phase of the useful signal included in all the telecommunications signals approximately in phase with the reference phase of said reference signal.

2. The phase-control system claimed in claim 1 wherein said filtering means for deriving the derived reference signal comprises a bandpass filter having said narrowband, an amplifier responsive to an output signal of said bandpass filter, a limiter responsive to an output signal of said amplifier and a low-pass filter responsive to an output of said limiter.

3. The phase-control system claimed in claim 1 wherein each of said phasing means comprises correlating means for comparing said phase of said reference signal with said phase of the useful signal in the respective telecommunications signal in response to signals having components that are in-phase and in quadrature relative to said respective telecommunications signal to derive two analog control signals, means for attenuating said in-phase and quadrature component signals on the basis of the sign and amplitude of said two analog control signals so as to substantially phase the said useful signal with said reference signal, and means for summing said attenuated component signals leaving said attenuating means.

4. The phase-control system claimed in claim 1 wherein said filtering means is coupled to an output of said frequency transposing and preamplifying means in one of said reception paths.

5. The phase-control system claimed in claim 1 wherein said filtering means is coupled to an output of said phasing means in one of said reception paths.

6. The phase-control system claimed in claim 1 wherein each reception path comprises means for detecting an envelope of said useful signal within said respective telecommunications signal, said envelope detecting means including means for correlating said reference signal with said respective telecommunications signal to derive an envelope signal with a reference voltage to derive a gain control signal, and means interconnected in said reception path for amplifying said telecommunications signal as a function of said gain control signal.

7. The phase-control system claimed in claim 6 wherein said amplifying means in each reception path is interconnected between said frequency transposing and preamplifying means and said phasing means in said reception path.

8. The phase-control system as claimed in claim 1 comprising means for calculating a phase difference $\Psi_b - \Psi_a$ between $\Psi_a$ and $\Psi_b$ phases of said useful signal in two telecommunications signals in any two reception paths in response to pairs of quadrature phase control signals, said pairs of quadrature phase control signals being derived by phase comparison means included in said phasing means of said two reception paths, and means for calculating an angle $\theta$ between a direction from said transmitting antenna to said receiving antenna and a mid-point perpendicular to a segment joining the two primary sources feeding said two reception paths, according to the relation:

$$\theta = \sin^{-1}((\Psi_b - \Psi_a) \cdot \lambda/(4\pi d))$$

where $\lambda$ is the wavelength of a carrier transmitted from said transmitting antenna and 2d is a distance between said two primary sources.

9. A receiver having an adaptive receiving antenna including N separate antenna elements responsive to a signal transmitted from a transmitting antenna, where N is an integer greater than one, the signal containing useful information having a predetermined frequency band and being combined with a disturbing signal having a frequency band with frequencies outside the predetermined band, the receiver comprising N seperate channels each separately responsive to a signal transduced by one of the N antenna elements, the signal transduced by the element for different ones of the channels tending to have different phases for the useful information of the respective channel, only one of said channels including narrow-band filter means responsive to the useful information in the signal supplied by the one element to said one channel for deriving a narrow-band reference signal having a frequency within the predetermined bandwidth and totally different from the band of the disturbing signal so the derived reference signal is not affected by the disturbing signal, the reference signal having a reference phase, said narrow band being included in and being very small with respect to the frequency band of said useful signal and outside the disturbing frequency signal band, means for supplying the derived reference signal to said N channels, channel k including means responsive to the reference phase of the reference signal and the signal supplied to channel k by antenna element k for controlling the phase of the useful information in the signal supplied to channel k by antenna element k so each of the N channels derives an output signal containing the useful information with approximately the same phase determined by the reference phase, where k is selectively each of the integers 1 ... N, and means for combining the output signals of channels 1 ... N.

10. The receiver of claim 9 wherein the phase control means includes means for causing the useful information in the output signal of channel k to be approximately at the same phase as the derived reference signal.

11. The receiver of claim 10 wherein the phase control means of channel k includes means for substantially attenuating the disturbing signal.

12. The receiver of claim 11 wherein the phase control means of channel k includes means for deriving first and second mutually orthogonal replicas of the signal supplied by antenna element k to channel k, means for correlating the replicas with the derived reference signal to derive a pair of correlated signals, and means for combining the correlated signals with the signal supplied by antenna element k to channel k to derive the output signal for channel k.

13. The receiver of claim 9 wherein the phase control means includes means for substantially attenuating the disturbing signal.

14. The receiver of claim 13 wherein the phase control means of channel k includes means for deriving first and second mutually orthogonal replicas of the signal supplied by antenna element k to channel k, means for correlating the replicas with the derived reference signal to derive a pair of correlated signals, and means for combining the correlated signals with the signal supplied by antenna element k to channel k to derive the output signal for channel k.

15. The receiver of claim 9 wherein the phase control means of channel k includes means for deriving first and second mutually orthogonal replicas of the signal supplied by antenna element k to channel k, means for correlating the replicas with the derived reference signal to derive a pair of correlated signals, and means for combining the correlated signals with the signal supplied by antenna element k to channel k to derive the output signal for channel k.

16. A communication system comprising a transmitter having an antenna for transducing a signal containing useful information having a predetermined frequency band, the signal transduced by the transmitter antenna containing useful information being combined in transmission to a receiver with a disturbing signal having a frequency band with frequencies outside the predetermined band, the receiver including: N separate antenna elements responsive to the signal transduced by the transmitter antenna, where N is an integer greater than one, the useful information being transmitted between the transmitter antenna and the N separate antenna elements via a path different from the path for the disturbing signal, N separate channels each separately responsive to a signal transduced by one of the N antenna elements, the signal transduced by the element for each channel tending to have different phases for the useful information of the respective channel, only one of said channels including narrowband filter means responsive to the useful information in the signal supplied by the one element to said one channel for deriving a narrow-band reference signal having a frequency within the predetermined bandwidth and totally different from the band of the disturbing signal so the derived reference signal is not affected by the disturbing signal, said narrow band being included in and being very small with respect to the frequency band of said useful signal and outside the disturbing frequency signal band, means for supplying the reference signal to said N channels, channel k including means responsive to the derived reference signal and the signal supplied to channel k by antenna element k for controlling the phase of the useful information in the signal supplied to channel k by antenna element k so each of the N channels derives an output signal containing the useful information with approximately the same phase, where k is selectively each of the integers 1 . . . N, and means for combining the output signals of channels 1 . . . N.

17. The system of claim 16 wherein the phase control means includes means for causing the useful information in the output signal of channel k to be approximately at the same phase as the derived reference signal.

18. The system of claim 17 wherein the phase control means of channel k includes means for substantially attenuating the disturbing signal.

19. The system of claim 18 wherein the phase control means of channel k includes means for deriving first and second mutually orthogonal replicas of the signal supplied by antenna element k to channel k, means for correlating the replicas with the derived reference signal to derive a pair of correlated signals, and means for combining the correlated signals with the signal supplied by antenna element k to channel k to derive the output signal for channel k.

20. The system of claim 16 wherein the phase control means of channel k includes means for deriving first and second mutually orthogonal replicas of the signal supplied by antenna element k to channel k, means for correlating the replicas with the derived reference signal to derive a pair of correlated signals, and means for combining the correlated signals with the signal supplied by antenna element k to channel k to derive the output signal for channel k.

21. The system of claim 16 wherein said filtering means for deriving the derived reference signal comprises a bandpass filter having said narrowband, an amplifier responsive to an output signal of said bandpass filter, a limiter responsive to an output signal of said amplifier and a low-pass filter responsive to an output of said limiter.

22. The receiver of claim 9 wherein said filtering means for deriving the derived reference signal comprises a bandpass filter having said narrowband, an amplifier responsive to an output signal of said bandpass filter, a limiter responsive to an output signal of said amplifier and a low-pass filter responsive to an output of said limiter.

23. The system of claim 1 wherein the filtering means is connected in said one path so the phase of the signal supplied to said filtering means is unaffected by an output signal of the phasing means of any of said paths.

24. The receiver of claim 9 wherein the narrow band filter means is connected in said one channel so the phase of the signal supplied to said filter means is unaffected by an output of the phase controlling means of any of said channels.

25. The system of claim 16 wherein the narrow band filter means is connected in said one channel so the phase of the signal supplied to said filter means is unaffected by an output of the phase controlling means of any of said channels.

26. A communicating method comprising the steps of transmitting a signal containing useful information having a predetermined frequency band from a transmitting antenna; receiving the signal containing useful information at N separate antenna elements at a receiver, where N is an integer greater than one, the useful signal while propagating from the transmitting antenna to the receiver being disturbed by a disturbing signal, the disturbing signal arriving at the antenna elements in a direction different from the useful signal, the disturbing signal having a frequency band with frequencies outside of the predetermined frequency band of the useful signal, the useful signal arriving at different ones of the antenna elements with different phases, separately processing the signal arriving at each of the antenna elements in N processing channels so that the signal arriving at antenna element k is processed by channel k, where k is selectively each of integers 1 . . . N, responding to the signal arriving at only one of the antenna elements to derive a reference signal having a reference phase and a frequency band that is within and narrow relative to the width of predetermined frequency band and that is totally outside the frequency band of the disturbing signal so the derived reference signal is not affected by the disturbing signal, supplying the reference signal to said N channels, channel k responding to the reference phase of the derived reference signal and the signal supplied to channel k by antenna element k for controlling the phase of the useful information in the signal supplied to channel k by antenna element k so each of the N channels derives an output signal containing the useful information with approximately the same phase to form a receiver output signal that is larger than the output signal of any of the N channels, and combining the output signals of channels 1 . . . N.

27. The method of claim 26 wherein the useful signal in channel k is processed by phase shifting the signal received by antenna element k to derive four mutually orthogonal signals, deriving first and second indications of the phase difference between the reference phase of the derived reference signal and a first and second of the four mutually orthogonal signals, the first and second of the four mutually orthogonal signals having a $\pi/2$ phase difference, controlling the amplitudes of the four mutually orthogonal signals in response to the first and second indications so that the amplitudes of a first pair of the four signals that are $\pi/2$ phase displaced are controlled in a complementary manner by the first indication and the amplitudes of a second pair of the four signals that are $\pi/2$ phase displaced are controlled in a complementary manner by the second indication, and deriving the output signal for channel k by adding the four mutually orthogonal signals after the amplitudes of the four mutually orthogonal signals have been controlled.

28. The method of claim 26 wherein the useful signal in channel k is processed by phase shifting the signal derived by antenna element k to derive mutually orthogonal signals, deriving first and second indications of the phase difference between the derived reference signal and a pair of the mutually orthogonal signals having a $\pi/2$ phase difference, controlling the amplitudes of the mutually orthogonal signals in response to the first and second indications, and deriving the output signal for channel k by adding the mutually orthogonal signals after the amplitudes of the mutually orthogonal signals have been controlled.

* * * * *